(12) United States Patent
Bergevin

(10) Patent No.: US 6,295,756 B1
(45) Date of Patent: *Oct. 2, 2001

(54) SURFACE FOR SPORTS AND OTHER USES

(75) Inventor: Jerry G. Bergevin, Edmonds, WA (US)

(73) Assignee: Turf Stabilization Technologies Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/964,942

(22) Filed: Nov. 5, 1997

Related U.S. Application Data

(63) Continuation-in-part of application No. 08/744,758, filed on Nov. 6, 1996, now Pat. No. 5,850,708, which is a continuation-in-part of application No. 08/334,414, filed on Nov. 4, 1994, now Pat. No. 5,586,408, which is a continuation of application No. 08/078,624, filed on Jun. 17, 1993, now abandoned, which is a continuation-in-part of application No. 07/902,147, filed on Jun. 22, 1992, now abandoned.

(51) Int. Cl.$^7$ .................................................. E01C 13/08
(52) U.S. Cl. ......................................... 47/1.01 R; 47/58.1
(58) Field of Search ................................... 47/58, 1.01 R, 47/52, 9; 472/92; 405/258; 428/17

(56) References Cited

U.S. PATENT DOCUMENTS

| | | | |
|---|---|---|---|
| 2,515,847 | * 7/1950 | Winkler | 428/17 |
| 2,605,589 | * 8/1952 | Kuestner | 47/1.01 R |
| 3,446,122 | 5/1969 | Raichle et al. | |
| 3,661,687 | * 5/1972 | Spinney, Jr. et al. | 161/21 |
| 3,703,786 | 11/1972 | Swan | |

(List continued on next page.)

FOREIGN PATENT DOCUMENTS

| | | |
|---|---|---|
| 1 817 624 | 5/1968 | (DE) . |
| 2 160 576 | 6/1973 | (DE) . |
| 25 22 864 | 12/1976 | (DE) . |
| 32 26 830 | 1/1984 | (DE) . |
| 33 13 329 | 10/1984 | (DE) . |

(List continued on next page.)

OTHER PUBLICATIONS

Jerry Bergevin, Memorandum re: UCLA Installation for Practive Field, Jan. 30, 1995.

Notts Sport, Notts Sport Grass Reinforcement Passes Tough Scottish Trials, Notts Sport News, Grass Reinforcement Ed., 2 pgs. (1990).

Notts Sport, Stonehenge Trials Lead to More Orders, Notts Sport News, Grass Reinforcement Ed., 2 pgs. (1990).

Notts Sport, Children at Play—The Next Four Years, Notts Sport News, Child's Play Ed., 2 pgs.

Etter, How Kentucky Bluegrass Grows, (undated).

Young Utes Will Depend on Home Advantage, The Fresno Bee, Aug. 23, 1995, pp. D1, 5, 6.

(List continued on next page.)

*Primary Examiner*—Peter M. Poon
*Assistant Examiner*—Son T. Nguyen
(74) *Attorney, Agent, or Firm*—Wood, Herron & Evans L.L.P.

(57) ABSTRACT

An improved playing surface including a synthetic turf base positioned atop a foundation. The synthetic turf base includes synthetic fibers secured to a backing material. The synthetic turf base also includes a surface layer of growth medium applied on top of the backing material to reach a predetermined depth. Natural grass is planted in the surface layer of growth medium. The backing is provided with perforations or openings sufficient in number to permit the roots of the natural grass to extend through the backing into the sub-base of the foundation.

26 Claims, 8 Drawing Sheets

U.S. PATENT DOCUMENTS

| | | | |
|---|---|---|---|
| 3,771,787 | * 11/1973 | Wood, Jr. | 273/29 |
| 3,801,421 | * 4/1974 | Allen et al. | 428/17 |
| 3,863,388 | * 2/1975 | Loads | 47/56 |
| 3,995,079 | * 11/1976 | Haas, Jr. | 428/17 |
| 4,007,556 | 2/1977 | Gluck et al. . | |
| 4,023,506 | * 5/1977 | Robey | 47/58 |
| 4,044,179 | * 8/1977 | Haas, Jr. | 428/17 |
| 4,073,753 | 2/1978 | Hauge . | |
| 4,268,551 | * 5/1981 | Moore, Jr. | 428/17 |
| 4,318,248 | 3/1982 | Muldner . | |
| 4,337,283 | * 6/1982 | Haas, Jr. | 428/17 |
| 4,389,435 | * 6/1983 | Haas, Jr. | 428/17 |
| 4,396,653 | * 8/1983 | Tomarin | 428/17 |
| 4,462,184 | 7/1984 | Cunningham . | |
| 4,501,420 | 2/1985 | Dury . | |
| 4,572,700 | 2/1986 | Mantarro et al. . | |
| 4,735,825 | * 4/1988 | Friedrich | 427/202 |
| 4,852,870 | 8/1989 | Hawkins et al. | 272/3 |
| 4,900,010 | * 2/1990 | Wengmann et al. | 272/3 |
| 4,916,855 | * 4/1990 | Halliday et al. | 47/58 |
| 5,014,462 | 5/1991 | Malmgren et al. . | |
| 5,205,068 | 4/1993 | Solomou | 47/56 |
| 5,489,317 | 2/1996 | Bergevin | 47/1.01 |
| 5,586,408 | 12/1996 | Bergevin | 47/1.01 |
| 6,029,397 | 2/2000 | Motz et al. . | |

FOREIGN PATENT DOCUMENTS

| | | |
|---|---|---|
| 36 02 060 | 7/1987 | (DE) . |
| 37 03 866 | 8/1988 | (DE) . |
| 37 23 364 | 1/1989 | (DE) . |
| 195 21 944 A1 | 12/1995 | (DE) . |
| 0 062 738 A2 | 10/1982 | (EP) . |
| 0 154 841 | 2/1985 | (EP) . |
| 0174755 | 3/1986 | (EP) . |
| 0 204 381 | 12/1986 | (EP) . |
| 260769A1 | 3/1988 | (EP) . |
| 263566A1 | 4/1988 | (EP) . |
| 0 373 282 | 12/1988 | (EP) . |
| 0 403 008 | 12/1990 | (EP) . |
| 2 333 534 | 1/1977 | (FR) . |
| 2 556 381 | 6/1985 | (FR) . |
| 486776 | 6/1938 | (GB) . |
| 2225240 | 5/1990 | (GB) . |
| 53-12742 | 6/1977 | (JP) . |
| 59-151813 | 8/1984 | (JP) . |
| 24432 | * 2/1992 | (JP) . |
| 4-24432 | 2/1992 | (JP) . |
| 07207614 | 8/1995 | (JP) . |
| 08228512 | 9/1996 | (JP) . |
| 8500946 | 10/1986 | (NL) . |
| 403008 | * 12/1990 | (NL) ........ E01C/13/00 |
| 91-00202 | 4/1992 | (WO) . |
| 92-07142 | 4/1992 | (WO) . |
| PCT/GB91/ 01608 | 4/1992 | (WO) . |

OTHER PUBLICATIONS

Grass Finally Grows at Rice Stadium, The Salt Lake Tribune, Aug. 28, 1995, pp. D–1, 6.

The Green Grass of Gridirons Begins to Make a Comeback, The New York Times, Sep. 3, 1995, pp. 1, 24.

Start–up in McLean Fields Entry in Athletic—Turf Wars, Washington Business Journal, Feb. 10–16, 1995, p. 3.

A Special Background Report on Trends in Industry and Finance, The Wall Street Journal, Jan. 26, 1995.

Utes Break New Ground, publication of the University of Utah.

Neat Stuff at the 'Other Show', Golf World, Apr. 1995, p. 144.

Utah Has a Tough New Turf, Deseret News (undated), pp. D1, 8.

UCLA.

Rice Stadium.

Utah.

2–page memorandum of Jan. 1995 (relates to item A).

Selected pages of Deposition transcript of Bergevin Deposition, dated Mar. 11, 1999 (relates to item C).

Letter from Webb Cook dated Oct. 6, 1997 (relates to item C).

Printout of the current website of SportGrass, Inc., the licensee, relative to press release and newspaper article (relates to all three items, and other smaller test sites).

Turf Concepts, Inc. brochure.

SportGrass Maintenance guidelines.

Safety Play Systems Inc., "Keep Off—Your Feet Are Killing Me!" *Notts Sport News,* Golf Ed., 2 pgs.

Safety Play Systems Inc., "The Envelope' Base System," 6 pgs. (1992).

Netlon Advanced Turf–Rootzone Technology–Stronger by Nature, Netlon, Blackburn, England, Jan., 1992.

Netlon Advanced Turf–Where Turf Alone Would Fail, Netlon, Blackburn, England, 7 pgs.

"The Tried and Tested Sand–Filled Artificial Turf," *DLW Sportfloor,* date unknown.

"Sand–Filled Artificial Turf–We Take Nature as our Model," *DLW Sportfloor,* date unknown.

"Brabauts Dagblad" (newspaper), Jul. 14, 1992, Holland.

* cited by examiner

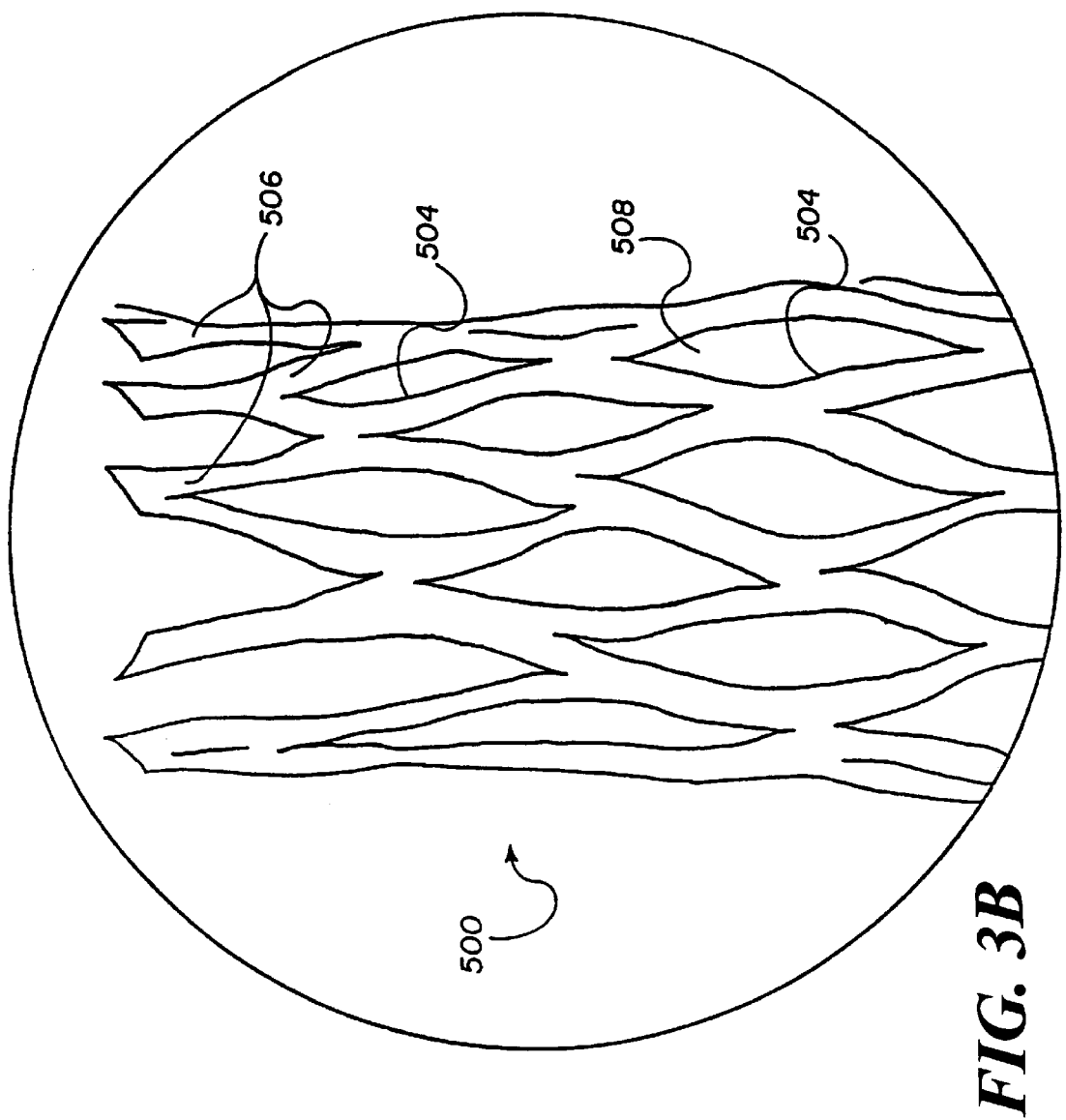
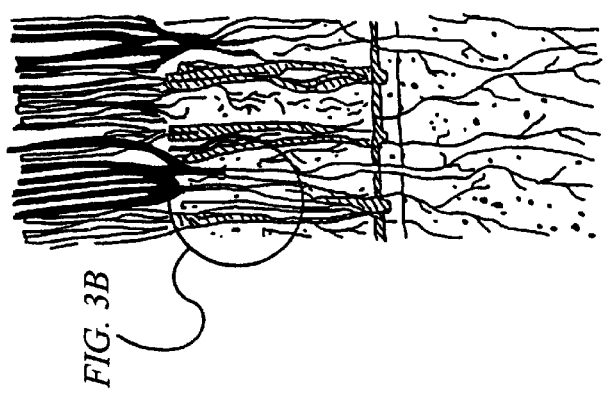
FIG. 3A
FIG. 3B

SURFACE FOR SPORTS AND OTHER USES

This is a continuation-in-part of U.S. patent application Ser. No. 08/744,758 filed Nov. 6, 1996 now U.S. Pat. No. 5,850,708, which is a continuation-in-part of U.S. patent application Ser. No. 08/334,414, filed on Nov. 4, 1994 now U.S. Pat. No. 5,586,408, which is a continuation of U.S. patent application Ser. No. 08/078,624, filed Jun. 17, 1993, now abandoned, which is a continuation-in-part of U.S. patent application Ser. No. 07/902,147, filed Jun. 22, 1992, now abandoned, the disclosure of which is incorporated herein, in its entirety, by the foregoing reference thereto.

FIELD OF THE INVENTION

The present invention is directed toward an improved surface for sports and other uses.

BACKGROUND OF THE INVENTION

For years natural turf surfaces were used for most outdoor sports, for example, soccer, football, field hockey, cricket, rugby, etc. Natural turf surfaces are surfaces constructed with a grass grown in soil, or some other surface layer of material (e.g., sand and organic mixes, etc.), that is constructed upon a suitable foundation. A natural turf surface is generally preferred for its comfort, feel, grip, and appearance.

However, under heavy use and/or poor weather conditions, natural turf surfaces deteriorate rapidly and maintenance is costly. Intense activity on the turf destroys the grass and its root system, leaving mud and/or dirt as the playing surface. Prior to re-establishment of the turf, the surface is unsightly and often pockmarked, uneven, and possibly hazardous to use.

Another problem associated with natural turf surfaces is the use of painted on yardage and boundary lines. Typically, such boundary lines are formed by painting the playing surface. For aesthetic reasons, such lines are generally painted just prior to each official game played on the playing surface. The repeated application of paint to the surface of the playing surface tends to kill the grass that is located under the painted surface. In addition, over time the multiple layers of paint build up forming a surface that is substantially harder than the surrounding natural grass playing surface. Thus, the painted areas of the playing surface can create slippery spots within the playing surface, possibly leading to slips and falls by athletes using the playing surface. In addition, the painted areas can increase the possibility of injury to the athlete and create hard spots that can be uncomfortable or painful to an athlete that falls upon the painted area.

Due to the needs of sports programs, even after destruction of portions of the turf, play usually continues on the playing surface, even when the surface is badly damaged, until the sport's season is over, when the turf can be re-established. Thus, the playing conditions on the playing surface continually decline over the season. At the end of the season, the natural turf surfaces are reseeded, the divots leveled and filled, etc. The natural turf surfaces are not usable during this re-establishment period because use defeats the re-establishment of the turf. The re-establishment period typically takes at least four months, or longer, under ideal weather conditions, during which the natural turf surface should not be used.

Recently, synthetic surfaces have been used as an alternative to natural turf surfaces. Synthetic surfaces generally come in two types, i.e., conventional and sand filled. Conventional synthetic is a dense synthetic material that has the appearance of dense grass blades but is manually placed indoors or outdoors, usually upon an asphalt, concrete, wood, or other foundation. Sand-filled synthetic is a synthetic material similar to conventional synthetic turf, but with greater spacing between the blades, to accommodate a silica sand filling.

Both the conventional and sand-filled synthetics are placed indoors or outdoors, upon a foundation that may include an asphalt, concrete, wood or other supporting subsurface along with cushioning mats, water drainage and water irrigation.

Although synthetic turf surfaces are more durable than well-established natural turf surfaces, they are only moderately successful for sports and other uses. The most notable disadvantage of synthetic turf surfaces is the discomfort for the players and an increased number of injuries. Additionally, synthetic turf surfaces are generally expensive to put in place and have a life expectancy of 8–15 years, if properly maintained, and less if poorly maintained. Outdoor synthetic turf surfaces also remove large areas from the ecosystem, reducing natural processes including ground water recharge, oxygen and carbon monoxide balance, temperature modulation, and dust filtration. For these and other reasons, a number of synthetic turf surfaces are currently being converted back to the natural turf surfaces.

As can be seen from the above discussion, there exists a need for an improved surface for sports and other uses, and a method of making the improved surface, wherein the surface provides improved comfort and fewer injuries to the users, while being durable under heavy use and in poor weather conditions. The present invention is directed toward fulfilling this need.

SUMMARY OF THE INVENTION

The present invention provides an improved surface for sports fields and for other high traffic uses. In one embodiment, the surface includes a foundation and a growth medium filled synthetic turf positioned atop the foundation. The synthetic turf base includes synthetic fibers attached to a permeable backing material with a layer of growing medium filled between the synthetic grass fibers. The synthetic fibers are constructed of a flexible, synthetic material and extend generally vertically upward from the backing material.

In one embodiment, the playing surface includes a foundation and a synthetic turf located on top of the foundation. The synthetic turf includes a backing material and a plurality of synthetic fibers extending generally vertically upward from the backing material. The synthetic fibers are formed of at least a first group of fibers having a first length and a second group of fibers having a second length that is longer than the first length so that the second group of fibers extend upward from the backing material a greater distance than the first group of fibers. A layer of growth medium is disposed in the synthetic turf to a depth sufficient to substantially fill the synthetic grass turf. In various embodiments, the layer of growth material may be filled to a level which is below, at, or above the top of the first group of fibers.

Natural grass is planted in the growth medium so that the roots grow downward through the growth medium, through the backing material, and into the foundation. The blades of the grass grow upward from the top of the growth medium to form a playing surface.

In accordance with other aspects of the invention, the second group of fibers are uniformly interspersed throughout the playing surface. The second group of fibers extend upward and are intertwined with the natural grass blades. The first group of fibers protect the crowns of the grass plants, while the second group of fibers help to protect the blades of the grass plants.

In accordance with other features of the invention, the second group of fibers are formed of a color that contrasts with the grass and provides a visual indicator. The second group of fibers are placed in an organized pattern to provide boundary indicators, line indicators, etc. The backing material in the region of the second group of fibers is formed of a material that is root-impervious. The backing material also includes a herbicide to prevent natural grass plants from growing into and through the backing material in the region of the second group of fibers.

In accordance with other aspects of the invention, the backing material is formed of a woven material. The woven material is provided some in-plane stability through the use of fusing the strands of the woven material along the edges of the synthetic grass turf.

In accordance with yet other aspects of the invention, a mesh material is placed beneath the foundation and the synthetic grass turf. The mesh material is located in the region of adjoining edges of the synthetic grass turf and underlies the adjoining edges of the synthetic grass turf. The roots of the grass plants grow through the synthetic grass turf, through the mesh material, and into the foundation, thus binding different pieces of the synthetic grass turf to the mesh material and the foundation. The mesh material can include protrusions extending from either one or both sides of the mesh material. The protrusions extend into the foundation and into the backing material in order to help anchor the edges of the synthetic grass turf.

The playing surface of the present invention improves the durability and visual appearance of natural grass playing surfaces. The playing surface of the invention helps to protect the crowns of the natural grass plants, thus helping to prevent damage to the natural grass. This allows the present invention to produce a playing surface that recovers more quickly than natural grass playing surfaces. However, the playing surface of the present invention is formed substantially of natural grass blades thus providing the comfort and appearance of a natural grass playing surface. The playing surface of the invention can also be formed with built-in visual indicators such as boundary or line indicators. Such line indicators do not have the disadvantages of prior painted-on line indicators.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 3A and 3B are more detailed illustrations of one embodiment of a synthetic grass fiber used in the invention;

DETAILED DESCRIPTION OF THE PREFERRED EMBODIMENT

Figure 1A:
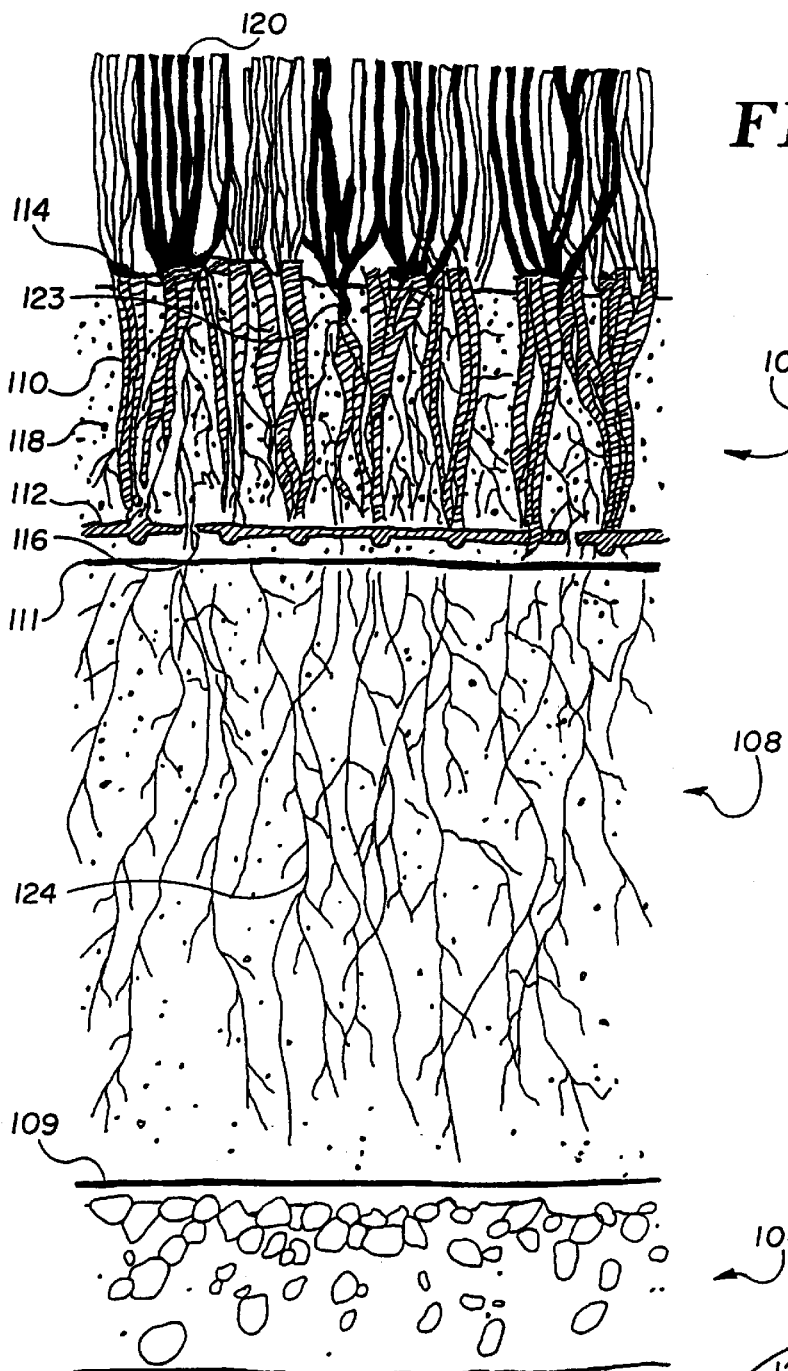
FIG. 1A is a cross-sectional view of a embodiment of an improved surface of the invention.
Figure 1B:
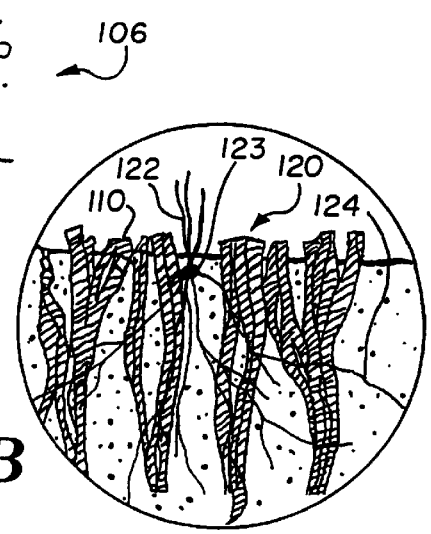
FIG. 1B is an enlarged cross-sectional view of a portion of the surface of FIG. 1A.

One embodiment of an improved surface 100 according to the invention is illustrated in FIGS. 1A and 1B. The improved surface 100 includes a foundation 102 upon which is mounted a synthetic turf base 104. The foundation 102 is constructed of a sub-grade 106 and a sub-base 108. The sub-grade 106 is constructed for providing a structural base. The sub-grade 106 may be formed of earth and rock existing on the site as is known in the art. Further, piping (not shown) may be placed in or on the sub-base 108 to provide drainage and/or irrigation to the sub-base 108. A sub-grade for use with the invention may be readily provided by those skilled in the art.

The sub-base 108 is positioned atop the sub-grade 106 and is constructed, among other things, to provide sufficient drainage of water from the improved surfacing 100 to the sub-grade 106. The sub-base 108 is further constructed to provide structural support to the synthetic turf base 104 and a growing medium, as will be discussed more fully below. The sub-base 108 may be constructed of any combination of materials known to those skilled in the art such as, for example, sand, rubber, rock, and other organic and/or inorganic materials. Like the sub-grade 106, the sub-base 108 may be readily constructed by those skilled in the art.

A first filter (optional) 109 is positioned intermediate the sub-grade 106 and the sub-base 108 and a second filter (optional) 111 is positioned intermediate the synthetic turf base 104 and the sub-base 108. The first and second filters 109 and 111 may each comprise a fabric or other material constructed to permit the flow of water from the synthetic turf base 104 to the sub-base 108 and the sub-grade 106, respectively. The first and second filters 109 and 111 are further constructed to restrict the flow of other substances (such as mud and other contaminants) between the synthetic turf base 104, the sub-base 108, and the sub-grade 106, i.e., to prevent such substances from moving downward or from migrating upward through the areas protected by the filters 109 and 111.

Adequate filters 109 and 111 may readily be selected by those skilled in the art. It will be apparent to those skilled in the art that either the first or the second perforated filter 109 or 111, or both, may be eliminated in some applications without departing from the spirit of the present invention.

The present invention is intended, among other uses, for use as a sports playing field, in which case a sub-base 108 atop the sub-grade 106 will most likely be desired to insure adequate support, and drainage to the improved surface 100. As will become apparent to those skilled in the art, the present invention is also suitable for use as other surfaces, such as, for example, fire access and parking medians, home yards, parks, and virtually anywhere that a natural or artificial turf surface is desired. In such applications, the sub-grade 106 and sub-base 108 may be modified to suit the particular use to which the invention is being put. In some applications, it may be desirable to eliminate the sub-base 108 altogether. However, it is generally desirable to provide some sub-base 108 (or alternatively, a modified sub-grade 106) upon which the synthetic turf base 104 can be supported.

The synthetic turf base 104 includes a multiplicity of synthetic fibers 110 that are tufted, or otherwise secured, to a flexible, porous backing 112. The synthetic fibers 110 are constructed of a synthetic material that is substantially flexible. The synthetic fibers 110 each extend generally upward from one side of the flexible backing 112 and are generally perpendicular to the flexible backing 112. The synthetic grass fibers 110 are of sufficient length that the top portions 114 are spaced upward from the flexible backing 112. As discussed in more detail below, the flexible backing 112 is porous and includes a plurality of openings 116 (through which grass roots and water may pass. The backing may include holes punched or otherwise formed to the backing or the backing may be a woven backing woven sufficiently coarse that the voids between the strands that form the backing form openings) that permit water drainage and root growth through the backing and into the foundation 102.

In one embodiment, the synthetic turf is of a type similar to that used to form sand-filled synthetic turf surfaces. However, it is preferable that the backing material have sufficient openings and that the density of the synthetic fibers be such as to allow a dense growth of natural grass over the surface and through the backing material.

It is advantages that the synthetic fibers 110 of the synthetic turf base 104 are partially slit, as illustrated in FIG. 3B, or "fibrillated," i.e., include several blade openings 508 through each synthetic grass fiber. The openings 508 in the synthetic fibers 110 and the backing openings 116 in the backing assist in binding the resulting improved surface 100 together as will be described in more detail below.

The flexible backing 112 is provided for positioning the synthetic fibers 110 during installation and maintaining the synthetic fibers 110 in position during use of the improved surface 100. Further, the flexible backing 112 provides structural support to the improved surface 100 by distributing the force of impact upon the improved surface, thereby helping to prevent compaction of the sub-base 108.

In one embodiment of the invention, the synthetic fibers 110 are tufted to a flexible backing 112 that is constructed from a woven fabric. The backing 112 is provided for receiving the synthetic fibers 110 to hold the synthetic fibers in relative position during installation and thereafter.

In one embodiment of the invention, the backing 112 is a mesh having the synthetic fibers 110 tufted into the backing. The backing may be formed of a nonbiodegradable material or may be partially or completely formed of biodegradable material selected to deteriorate after installation depending on the application. As discussed above, the backing 112 provides structural support to assist in holding the synthetic fibers 110 in position during installation.

As discussed below, it is important that the backing 112 include openings 116 to allow the roots of natural grass plants planted into the synthetic turf base 104 to pass through the backing. Therefore, in one embodiment the backing is formed of a woven material, an example of which is illustrated. Although woven materials allow roots to grow through the spaces between the individual woven fibers, it may be advantageous to form the backing from materials woven at least partially from biodegradable fibers. Using at least a portion of biodegradable fibers in the formation of the backing would allow such fibers to degrade over time, thus creating larger openings through the backing which the roots could grow.

As discussed above, it is also important that the backing support the synthetic fibers 110 during installation and also after installation until such time as the fibers become completely supported by a dense growth of natural grass plants within the synthetic turf base. Therefore, in some embodiments it may be advantageous to form the backing from woven fibers having varying degrees of biodegradability. For example, a portion of the fibers can be formed of a material that biodegrades over a first period of time, a second portion of the fibers can be formed of a material that biodegrades over a second period of time, etc. Therefore, the backing 112 may be formed of biodegradable materials that allow a portion of or all of the backing to biodegrade over an extended period of time, thus allowing the synthetic turf base to be fully supported by the growth of the natural grass plants while still allowing the backing material to biodegrade thus increasing the size and occurrence of openings through the backing material in order to allow for a greater growth of the roots of the natural grass plants through the backing.

One example of a biodegradable material for use in this application is urea formaldehyde resin, although those skilled in the art will appreciate that other biodegradable materials could be substituted therefore without departing from the true scope of the subject invention. The backing 112 may be constructed from a variety of materials for positioning the synthetic fibers 110 and retaining the synthetic grass fibers in the desired position. As one example, the synthetic fibers 110 may be tufted to the backing or woven to the backing 112.

In order to assist in holding the weft and warp fibers in the backing together and to help hold the synthetic fibers 110 in place, it is also advantages to incorporate a fiber fleece into the backing material. The fiber fleece is placed against the underside of the backing matter prior to the tufting of the synthetic grass blades into the backing material. The fiber fleece is then preferably needle punched into the weft and warp fibers of the backing material using a plurality of needles that punch up through the fleece and backing. The needle punching pushes part of the fleece through the weft and warp fibers of the backing thus attaching the fleece and backing together. The synthetic fibers 110 are then tufted through the fleece and backing. The fleece helps to hold the synthetic fibers in place creating a "tuft lock" between the synthetic fibers and the backing. This tuft lock helps to prevent the synthetic fibers from falling out during transportation or installation of the turf.

In the preferred embodiment, the fiber fleece is formed of a cellulosic biodegradable fiber having a weight of approximately one ounce per square meter. The use of a biodegradable fleece allows the fleece to degrade over time thus allowing a more dense growth of the roots of the natural grass blades through the backing over time.

For ease of installation, it is advantageous that the backing be formed in such a way that it is flexible out of plane, but that it maintain its in-plane stability so that the orientation of the edges of the material remain straight or otherwise fixed.

Unfortunately, standard woven materials tend to have little in-plane stability thus the woven materials allow in-plane slippage or movement which allows the edges of the material to become distorted. Such distortions can make it difficult to carefully align adjoining edges of the backing material as they are placed down during installation. Therefore, it is advantageous to form the backing material with some in-plane reinforcement to assist it in maintaining its in-plane stability. One method of increasing the in-plane stability of the backing material is illustrated in FIG. 9.

Figure 9:
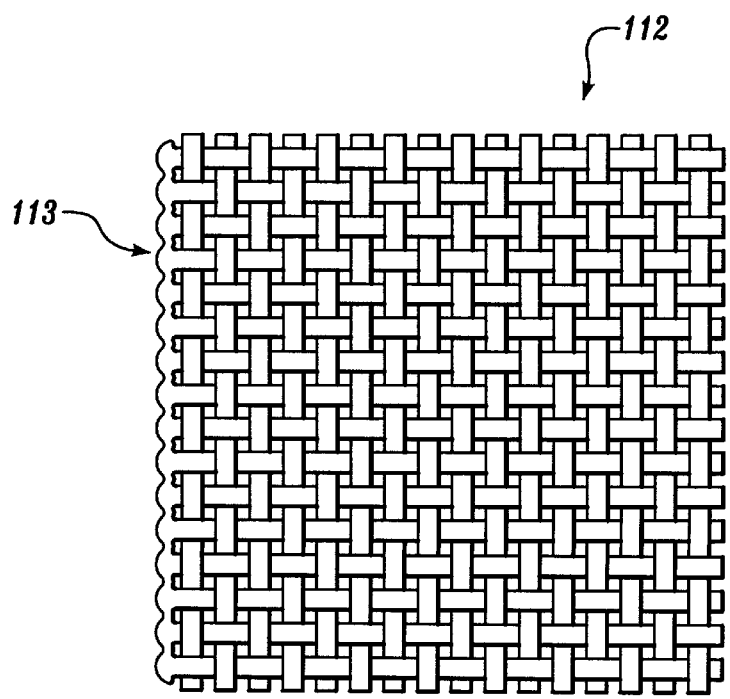
FIG. 9 is a top view of a backing material having a fused edge according to the present invention.

As illustrated in FIG. 9, the edge 113 of the backing 112 is cut using a heated cutter that fuses the ends of the individual fibers forming the backing material together along the cut edge. Fusing the ends of the cut fibers of the backing material provides some in-plane rigidity to the woven backing 112. This in-plane stability in turn assists during installation by helping to maintain the edge 113 of the cut backing material in the predetermined cut shape. In addition, fusing the edges 113 of the backing material during cutting helps to prevent the synthetic fibers 110 that are tufted or otherwise fastened into the backing 112 from coming loose from the backing during installation. Various equipment can be used to form the fused cut edge 113, including heated cutting knives, laser cutters, etc.

As mentioned above, preferably, the synthetic fibers 110 are constructed to include a number of blade openings (splits or fibrillations), as will be described by reference to FIGS. 3A and 3B. Therein, a synthetic fiber 500 is constructed from a substantially flexible material, for example, polyolefin or polypropylene. However, the flexible material may be constructed from any material commonly used in the art for making synthetic fibers. The flexible material is preferably extruded, or formed using any other technique known in the art, to construct a mesh or web-like structure. So constructed, the flexible material comprises a plurality of strands of material 504 positioned and secured to create a web that defines a plurality of openings 508. Those skilled in the art will appreciate that a synthetic fiber 500, such as the one illustrated in FIG. 3B is referred to in the art as a fibrillated fiber. The fibrillated synthetic fiber 500 is preferred to further integrate the improved surface 100, as will be described in more detail below.

In the embodiment illustrated in FIG. 1A synthetic fibers that are approximately 28 millimeters in length and that have a density of approximately 12 synthetic fibers per 10 centimeters are preferred for some turf applications. However, longer or shorter fibers could be used with greater or lesser density depending on the contemplated use and site conditions. As an example, one alternative embodiment uses synthetic fibers that are 33 millimeters in length and have a density of 13 synthetic grass fibers per 10 centimeters and another uses synthetic grass fibers that are 15 millimeters in length and have a density of 8–10 synthetic fibers per 10 centimeters.

Those skilled in the art will recognize that the construction of the synthetic turf base 104 may be farther varied without departing from the present inventions. As examples: the synthetic fibers 110 may be constructed or attached to the backing 112 so that the synthetic fibers are either "directional" or "nondirectional"; the openings in the synthetic fibers may be created by twisting several strands or fibers of material to provide a "twisted" synthetic fiber; the synthetic fibers can be constructed in a variety of arrangements, e.g., frizzed.

The synthetic turf base 104 further includes a surface layer of material 118 positioned atop the flexible backing 112. In the preferred embodiment of FIG. 1A, the surface layer of material 118 fills the synthetic turf base 104 from the flexible backing 112 to a point proximate the top portion 114 of the synthetic fibers 110. However, after filling the synthetic turf base 104, the surface layer of material 118 may settle slightly so that the top portions 114 of the synthetic fibers 110 extend slightly outward beyond the surface layer of material 118.

The improved surface 100 according to the preferred embodiments of the present invention further includes natural grass 120 that is planted in the surface layer of material 118. The natural grass 120 includes a multiplicity of grass blades 122 each having a crown 123 (FIG. 1B) and roots 124 associated therewith. The natural grass 120 is planted in the surface layer of material 118 so that the crown 123 is positioned just below the top of the surface layer of material 118, as is known in the art. Preferably, natural grass seeds are sown in the surface layer of material at a point where the crown will be located after the seeds germinate and the surface is established. Generally, it is desirable to position the crown 123 approximately one eighth to one quarter of one inch below the top of the surface layer of material 118. However, those skilled in the art will appreciate that the crown 123 may be positioned at varying distances from the top of the surface layer of material depending upon a variety of factors, e.g., the type of natural grass 120 and the composition of the surface layer of material 118. Those skilled in the art will further recognize that when planting varieties of natural grass which propagate by stolens, e.g. Zoysia, bentgrass, etc., sprigs or plugs of natural grass will be inserted into the surface layer of material 118 so that the crowns 123 are positioned just below the top of the surface layer of material 118. Constructed in this manner, the synthetic fibers 110 provide protection to the crowns 123 which is particularly advantageous during periods of heavy use and/or poor weather conditions.

It will further be appreciated by those skilled in the art that in the preferred embodiments of the invention discussed herein, the synthetic fibers 110 help to protect the crown 123 and the roots 124 of the natural grass 120 thereby minimizing the time required for the grass blades 122 to re-grow at times when the improved surface 100 is being re-established and to provide a surface with a smoother, grasslike appearance, which may be used during re-establishment. The presence of the natural grass 120 gives the improved surface 100 the comfort, feel, grip, and appearance of a conventional natural turf surface while the presence of the synthetic fibers 110 protects the crown 123 and roots 124 to protect the improved surface 100 from deterioration.

Referring to FIGS. 1A and 3A, the roots 124 of the natural grass 120 extend downward through the surface layer of material 118, through the blade openings 508 of the synthetic blades 110, and through the backing openings 116 of the flexible backing 112. Providing blade openings 508 through which the roots 124 extend permits the roots 124 to assist in integrating the natural grass 120 with the surface layer of material 118 and the synthetic grass fibers 110. Providing backing openings 116 through which the roots 124 can extend permits the roots 124 to assist in integrating the synthetic turf base 104 with the foundation 102. It is desirable, therefore, to provide blade openings 508 and backing openings 116 adequate in size and number to permit the roots 124 to penetrate from the surface layer of material 118 to the sub-base 108.

One method of providing blade openings 508 of adequate size and number is to provide synthetic grass fibers 500 with a web 506, as discussed above by reference to FIG. 3B. After the roots 124 have grown through the blade openings 508 of the synthetic grass fibers 500 the roots 124 will assist in maintaining the synthetic grass fibers 500 in position thereby integrating the synthetic turf base 104. Other methods for providing blade openings of sufficient size and number to permit the roots 124 to integrate the synthetic turf base will be apparent to those skilled in the art.

As discussed above, one method for providing backing openings 116 of adequate size and number is by forming the backing from another material. The site and number of openings can also be increased by using biodegradable fibers so that after the biodegradable fibers have deteriorated, the size and numbers of openings in the backing will increase to permit additional penetration of the roots 124 from the surface layer of material 118 to the sub-base 108. Those skilled in the art will appreciate that by permitting the roots 124 to penetrate the backing openings 116 of the flexible backing 112, the roots 124 will provide integration of the synthetic turf base 104 to the sub-base 108 beyond any conventional method for fixing the synthetic turf base 104 to the sub-base 108. The roots 124 will interact with the openings to firmly fix the synthetic turf base 104 to the sub-base, thereby preventing any movement across the sub-base or lifting at the edges.

As mentioned briefly above, the sub-base 108 is constructed to provide structural support to the synthetic turf base 104, as with conventional or sand-filled synthetic turf. Unlike conventional or sand-filled synthetic turf, however, the sub-base 108 is further constructed to provide a growing medium for the roots 124 of the natural grass 120.

The surface layer of material 118 may comprise a variety of materials for supporting the natural grass 120. In the presently preferred embodiment of the invention, the surface layer of material 118 is a mixture of sand and rubber particles. However, it will be apparent to those skilled in the art that the surface layer of material may comprise a variety of materials for supporting the natural grass and as a growing medium for the natural grass 120. Further, it is desirable to provide the surface layer of material 118 in sufficient quantity to assist in stabilizing the synthetic turf base 104 and the synthetic blades 110. Preferably, the surface layer of material 118 is provided in quantity sufficient to provide approximately five pounds for each square foot of the improved surface 100. However, more or less material may be provided in different applications. Also, it is desired to provide the surface layer of material 118 in sufficient quantity to extend from about one half to one inch from the flexible backing 112, to provide a sufficient growing medium for the roots 124 of the natural grass 120 above the flexible backing 112.

Due to the improved construction of the synthetic turf base 104 in combination with the natural grass 120, the selection of adequate materials for the surface layer of material 118 is not as limited as with sand-filled synthetic turf surfaces. As an example, it is generally accepted that only rounded silica sand, a somewhat scarce and expensive sand, is suited for use with sand-filled synthetic turf surfaces. This is because regular sand is abrasive against the synthetic grass blades, and tends to compact reducing surface drainage and creating a hard surface that is less comfortable for the user. However, in the invention the roots 124 of the natural grass 120 hold the surface layer of material 118 in place, thus regular sand may be used without increasing abrasion against the synthetic grass blades 110. The roots 124 of the natural grass 120 also provide some resiliency to movement in the synthetic turf base 104 thus reducing compaction. Still further, the grass blades 122 of the natural grass 120 protect the user from abrasion against the surface layer of material 118.

Although in some applications it is desirable to mix rubber, or other cushioning particles with the sand, it is generally accepted that rubber particles cannot be mixed with silica sand (and to some extent also, regular sand). This is because water and agitation of the sand will tend to separate the rubber particles from the sand, bringing the rubber particles to the top. However, due to the tendency of the roots 124 of the subject invention to hold the surface layer of material 118 in place, rubber particles may be mixed with the surface layer of material 118 to thereby provide a more comfortable playing surface. Also, the addition of rubber particles to the surface layer of material results in less compaction and, therefore, less mechanic aeration of the surface as part of a maintenance program is required.

In some applications where natural grass characteristics are desired, it is advantageous that the top portions 114 do not extend substantially beyond the surface layer of material 118. In such applications, the synthetic fibers protect the crown 123 and roots 124 of the natural grass. Since the root system of the natural grass 120 is protected by the synthetic blades, even when the blades 122 of the natural grass 120 are destroyed during play, they regrow quickly without the maintenance required for fully natural surfaces, i.e., replanting may not be required since the established roots 124 and crown 123 will regenerate new blades 122.

Another advantage of the preferred embodiment of the present invention is that the grass blades 122 of the natural grass 120 shield sunlight from the synthetic fibers 110 of the synthetic turf base 104 substantially reducing the breakdown of the synthetic fibers 110 due to ultraviolet light. Further, the incorporation of the natural grass 120 with the synthetic turf base 104 reduces wear of the synthetic turf base 104 since the roots 124 of the natural grass 120 reduce the grinding action of the sand on the synthetic turf. This reduction in wear and ultraviolet light breakdown increases the expected life of the improved surface 100, thereby reducing the long term cost of the surface.

Figure 4:
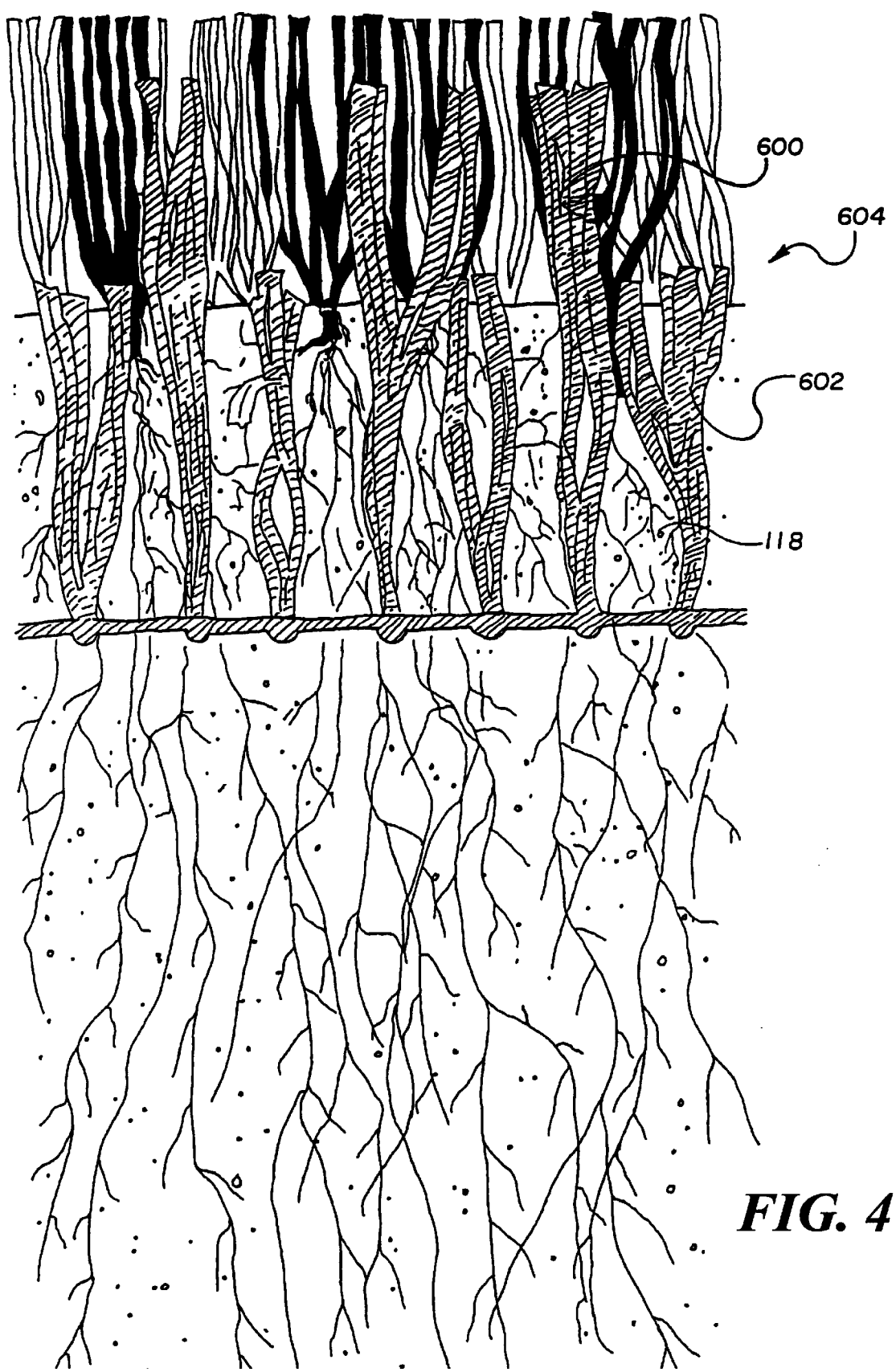
FIG. 4 is a cross-sectional view of another embodiment of the invention.

Referring to FIG. 4, in another embodiment of the invention, the synthetic grass fibers 600 and 602 are constructed from synthetic grass fibers having varying lengths. An improved surface 604 is constructed from synthetic fibers 600 having a first length and, synthetic fibers 602 having a second length secured to a flexible backing 608. As illustrated in FIG. 4, the length of the fibers 600 is greater than the length of the fibers 602 so that the synthetic fibers 600 extend outward from the flexible backing 608 a greater distance than the synthetic fibers 602.

The alternate improved surface 604 provides improved characteristics for selected applications. As one example, the improved surface 604 is particularly suited for use as the driving portion of a golf tee because the longer synthetic grass fibers 600 provide greater resistance to golf clubs and to support the golf balls above the top of the improved surface 604 thereby decreasing the damage to the remainder of the improved surface 604, and because the longer synthetic grass fibers 600 provide more uniform appearance after being used. As another example, a selected portion of the first portion 600 of synthetic grass fibers may be provided in a predetermined color for marking lines, logos, etc. Those skilled in the art will appreciate that the synthetic grass fibers of the subject invention may be constructed from a variety of lengths to provide different characteristics to the improved surface, and that two or more different lengths could be used in the same application.

As noted above, it is sometimes desirable to permit a portion, as described by reference to FIG. 4, of the synthetic fibers 110 to extend outward beyond the surface layer of material 118. This can provide additional protection to the crown 123, roots 124, and blades 122 of the natural grass 120, thereby possibly improving the durability of the natural grass. The characteristics of the resulting improved surface 100 can be varied by varying the length and density of the top portions 114 that is to be exposed (see FIG. 4). Further, at times when the grass blades 122 of the natural grass 120 are worn short, exposed portions of the synthetic grass fibers 110 of the synthetic turf base 104 and 604 may help to protect the crown 123, roots 124, and blades 122 and helps provide a visually pleasing surface.

A variant of the playing surface of FIG. 4 that is particularly suited for use with cleated athletic shoes entails filling the synthetic turf with growth medium 118 to a depth extending above the shorter fibers 602 and to approximately the top of the longer fibers 600. In this preferred embodiment, which is in essence a combination of the embodiments of FIGS. 1A and 4, the longer fibers 600 are suitably ¼ to ½ inch longer than the shorter fibers 602. Both fiber lengths stabilize the growth medium 118 and roots of the natural grass, while the longer fibers 602 also protect the crowns of the natural grass, and the natural grass blades extend upwardly above the fibers and growth medium to present a natural grass playing surface. An upper portion of the growth medium 118 is stabilized by only the longer fibers 600, leaving uniformly dispersed pockets of growth medium 118 above the tips of the shorter fibers 602. Cleats of athletic shoes can more easily penetrate these pockets of growth medium, as compared to the playing surface of FIG. 1A, for improved traction.

Figure 6:
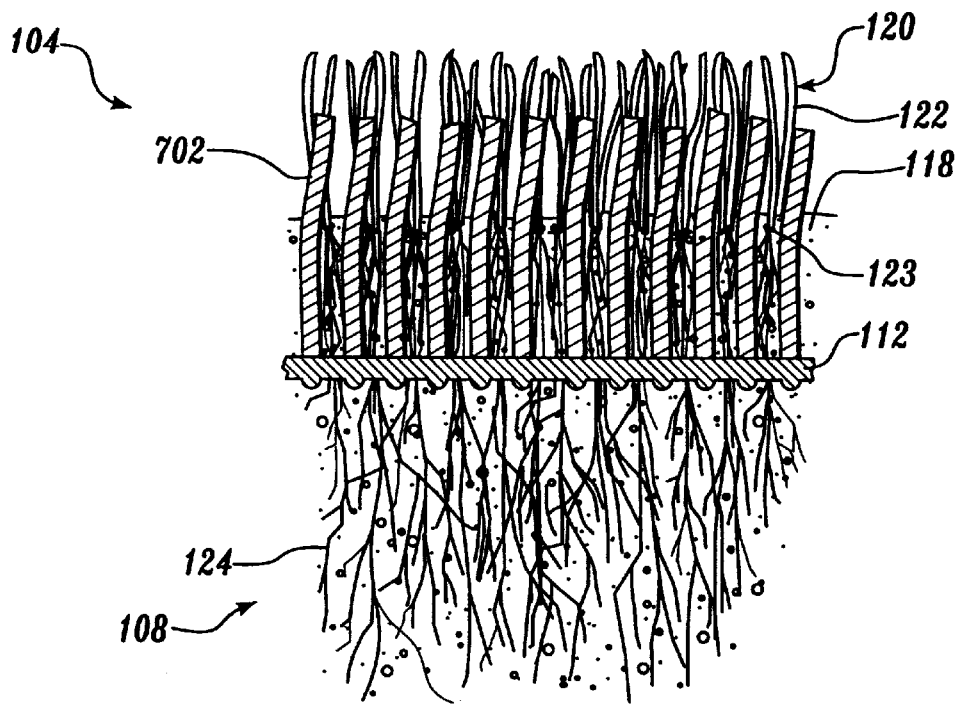
FIG. 6 is a cross section of another embodiment of an improved surface of the invention.
Figure 7:
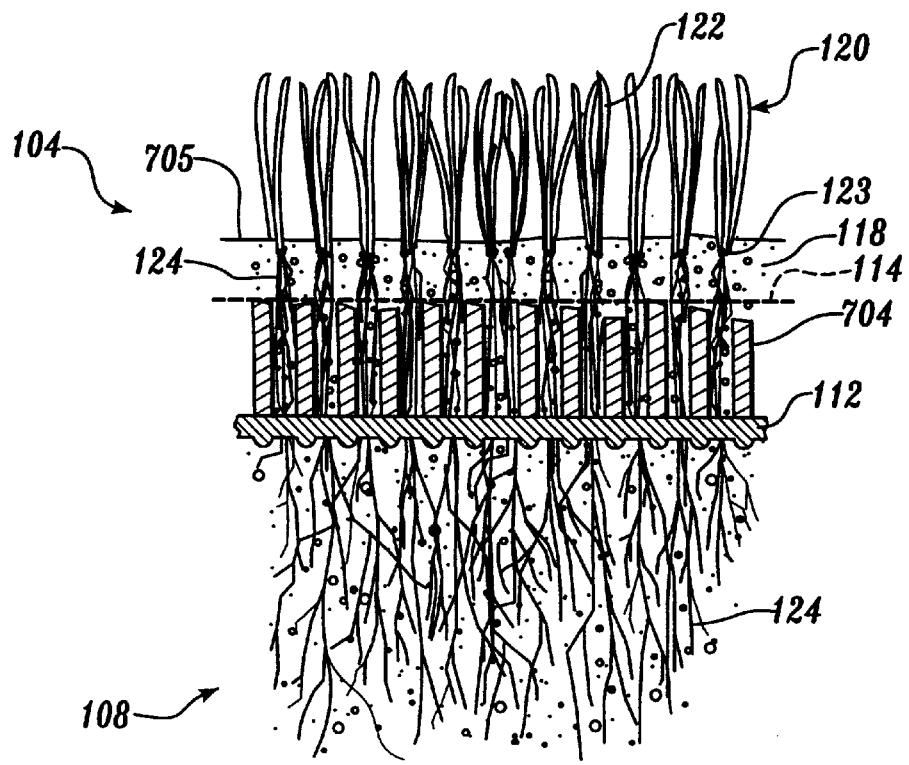
FIG. 7 is a cross-sectional view of yet another embodiment of an improved surface of the invention.

FIGS. 6 and 7 illustrated two alternative embodiments of the invention. The alternative embodiment illustrated in FIG. 6 is intended for applications in which it is desirable to add additional support and protection for the natural grass blades. In this embodiment, the surface layer of growth medium material 118 is initially filled to a level substantially below the tops of the synthetic fibers 702 of the synthetic turf base 104 which are generally longer then the preferred embodiment described above.

Thus, the playing surface is constructed from the backing 112 from which the synthetic fibers 702 extend vertically upward. Growth medium material 118 partially fills the voids between synthetic fibers 702 on top of the backing 112. The natural grass 120 has crowns 123 located between the synthetic fibers 702 near the upper surface of the growth material 118. The roots 124 grow downwardly through the material 118 and backing 112 into the sub-base 108. The grass blades 122 rise upwardly above the height of the fibers 702.

Preferably, the synthetic fibers 702 have a length of between approximately 15 and 35 millimeters, depending on use, and most preferably a length between 28 and 35 millimeters. Preferably, the surface layer is filled with a growth medium to a depth of between 12 and 28 millimeters, resulting in at least 5 pounds or more of growth medium per square foot of synthetic turf. It is desirable to use at least 8 pounds of growth medium per square foot, as determined by the length of the fibers, in order to ensure that there is sufficient growth medium on top of the synthetic turf base to maintain the synthetic turf base in position during use, thus preventing the synthetic turf base from moving and thus causing damage to the natural grass planted within the synthetic base. Preferably, the synthetic fibers 702 extend between 5 and 15 millimeters above the surface of the growth medium. The exact length of the fibers extending above the surface of the growth medium may change depending upon the application and the type of natural grass planted in the synthetic turf base. Similar to the embodiment shown in FIG. 4 and discussed above, the embodiment of FIG. 6 adds additional protection to protect the grass blades of the natural grass plants. In addition, the embodiment of FIG. 6 helps to ensure that a natural green appearance remains even after the natural grass blades have been worn away during heavy use. Depending upon the application, the embodiment of FIG. 6 may be preferred, for example, in situations where it is desirable to protect the grass blades in addition to the crowns of the natural grass. However, in other applications where a playing surface that has the characteristics of a natural grass surface is desired, the embodiment of FIG. 1 is preferred.

Yet another embodiment of the present invention is illustrated in FIG. 7. In the embodiment of FIG. 7, the synthetic turf is located between the top surface of the growth medium such that the top portions 114 of the synthetic fibers are located a predetermined distance below the top portion of the layer of growth medium material 118 and also below the crowns 123 of the grass blades 120. In the embodiment of FIG. 7, the synthetic turf provides support for the foundation and roots of the natural grass plants, but does not directly protect the crowns of the natural grass plants.

The embodiment of FIG. 7 provides a playing surface constructed from a synthetic turf base 104 positioned over a sub-base 108. The growth medium material is applied on top of the backing 112, filling the voids between the vertically extending synthetic fibers 704 and continuing to an overfilled depth, defining an upper surface 705 at an elevation well above the top portions 114 of the fibers 704. The crowns 123 of the natural grass plants 120 are located within the growth medium material 118, just below the upper surface 705 and above the top portions 114 of the synthetic fibers 704. This embodiment thus gives an all natural grass playing surface, the roots 124 of which are stabilized by the synthetic turf base 104, and the crowns of which are in a growth medium layer portion above the synthetic fibers.

The embodiment of FIG. 7 is a particularly well suited for use with rhizomatious grass, such as Zoysia and Bermuda grass, which form a laterally extending network of rhizomes so that the unprotected crowns 123 playing surface can withstand wear and tear.

As shown in FIG. 7, the surface layer material 118 is filled to a level substantially above the tops of the synthetic fiber 704. In one embodiment, the synthetic fibers have a length of between 15 and 35 millimeters and the layer of material 118 is filled so that the top of the layer of material is located between approximately 5 and 25 millimeters above the top portions 114 of the synthetic fibers. The natural grass 120 is then planted on top of the layer of material 118.

In both the embodiments shown in FIG. 6 and FIG. 7, the natural grass 120 may be planted in the surface layer of material 118, by seeding or by sprigging (i.e. inserting sprigs or plugs of grasses which propagate by stolens). Natural grass 120 may also be planted in the embodiment of FIG. 7 by sodding. In all embodiments, the roots 124 of the natural grass 120 grows down into the surface layer of material 118 and through holes 116 in the flexible backing 112 into the sub-base 108.

Figure 2:
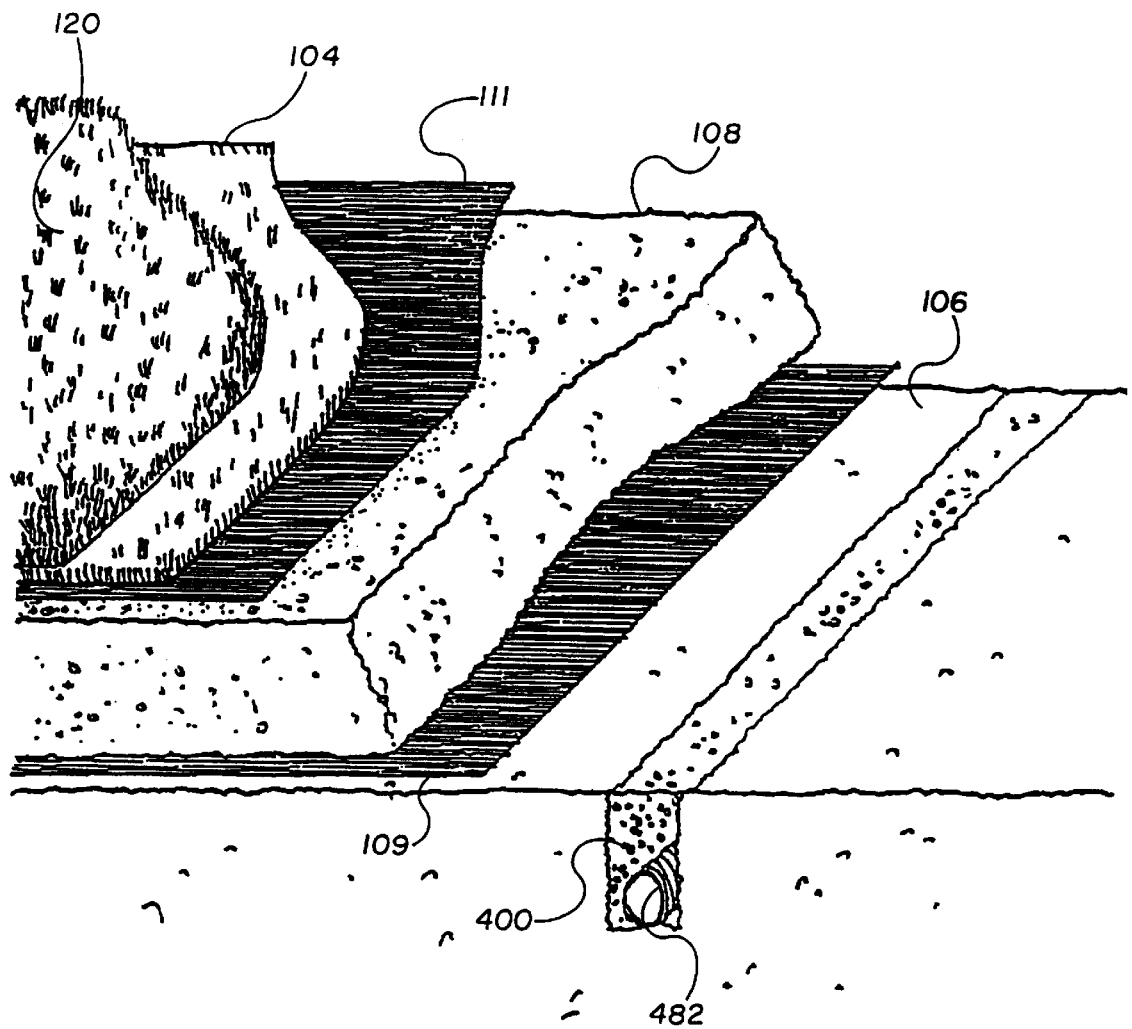
FIG. 2 is a partial cutaway view showing the construction of the surface of FIG. 1A.

Referring to FIG. 2, a description of a method of constructing one embodiment of an improved surface 100 according to the invention is described. Initially, the sub-grade 106 is prepared by forming trenches 400 and adding drainage piping 482. Thereafter, the second perforated filter 109 is added atop the subgrade 106, if desired, and is followed by formation of the sub-base 108. If the first perforated filter 111 is desired, it is placed upon the sub-base 108 followed by the synthetic turf base 104, including the surface layer of material 118. It should be noted that filters 109 and 111 are not considered to be within the scope of the invention. Those skilled in the art will readily appreciate that the filters 109 and 111 are optional and one or the other or both may be omitted depending upon the application. After the synthetic turf base 104 has been installed, the natural grass 120 (FIG. 1A) is planted so that the crown 123 and roots 124 can form, as described above.

One advantageous way of installing the improved surface 100 is to fabricate panels or sod which have been preplanted with natural grass as described in accordance with one of the embodiments described above. The synthetic turf base may be manufactured in panels of a size readily stored, transported, and installed, e.g., of approximately 16 inches by 48 inches or may be fabricated at a sod farm and then cut, rolled and transported on site and installed. During manufacturing, the synthetic turf base is filled with a surface layer of material which is seeded, sprigged, or sodded to create a pre-planted panel.

Preferably, in the case of pre-planted panels, the panels are manufactured by combining a binding material with the surface layer of material to stabilize the components of the pre-planted panel during manufacture, transportation, and installation. Preferably, the binding material is selected as a material that can be readily decomposed after the pre-planted panels are installed, as will be described in more detail below. A presently preferred binding material that may be used is a biodegradable material. Other binding materials, such as degradable materials may also be used, as will become apparent to those skilled in the art.

The manufacture of the pre-planted panel may be continued by combining the binding material with the surface layer of material in a variety of ways. As an example, the binding material may be combined with the surface layer of material in a substantially dry form, combined with a sufficient amount of water or other activating agent, and dried to create a substantially cohesive structure. As an alternative, the surface layer of material may be combined with a binding material in a substantially liquid form, and thereafter dried to create a substantially cohesive structure.

In either method, it is desired to initially provide only that amount of surface layer of material that is desired intermediate the natural grass and the backing of the synthetic turf base. To complete the manufacture of the pre-planted panel, the natural grass may be provided and the process completed to add that additional amount of surface layer of material desired intermediate the natural grass and the top of the pre-planted panel. The additional amount of surface layer of material may be stabilized with a binding material, as described above. Thus produced, the pre-planted panels may be readily stacked and/or otherwise stored, prior to shipping and installation. Those skilled in the art can readily identify favorable storage conditions.

The pre-planted panels constructed in this manner may be produced in a controlled production environment thereby assuring a consistently high quality of product with the exact specification of ingredients required for each application. Various steps required to build this surface at the site may be completed in the controlled production environment thereby greatly reducing installation time at the site. Additionally, each panel manufactured can be substantially identical and, therefore, the installed surface will not be subject to variation that may exist as a result of variation between local installers, local materials, and weather conditions. Another advantage is that the pre-planted panels may be installed under most weather conditions. The time for installation is significantly less than that required for installation of the improved surface when constructed without using seeded panels. Considerable cost-saving in the handling and installation of the material is also achieved.

Figure 5A:
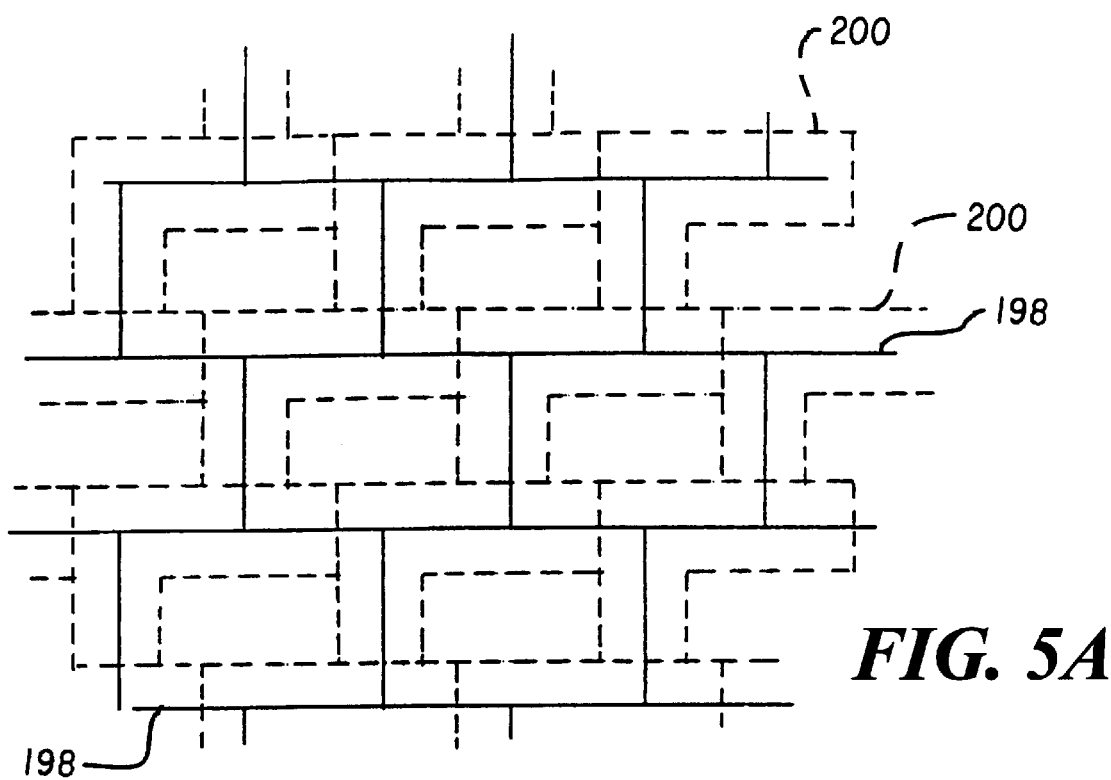
FIGS. 5A and 5B are illustrations of seeded panels during installation according to the invention.
Figure 5B:
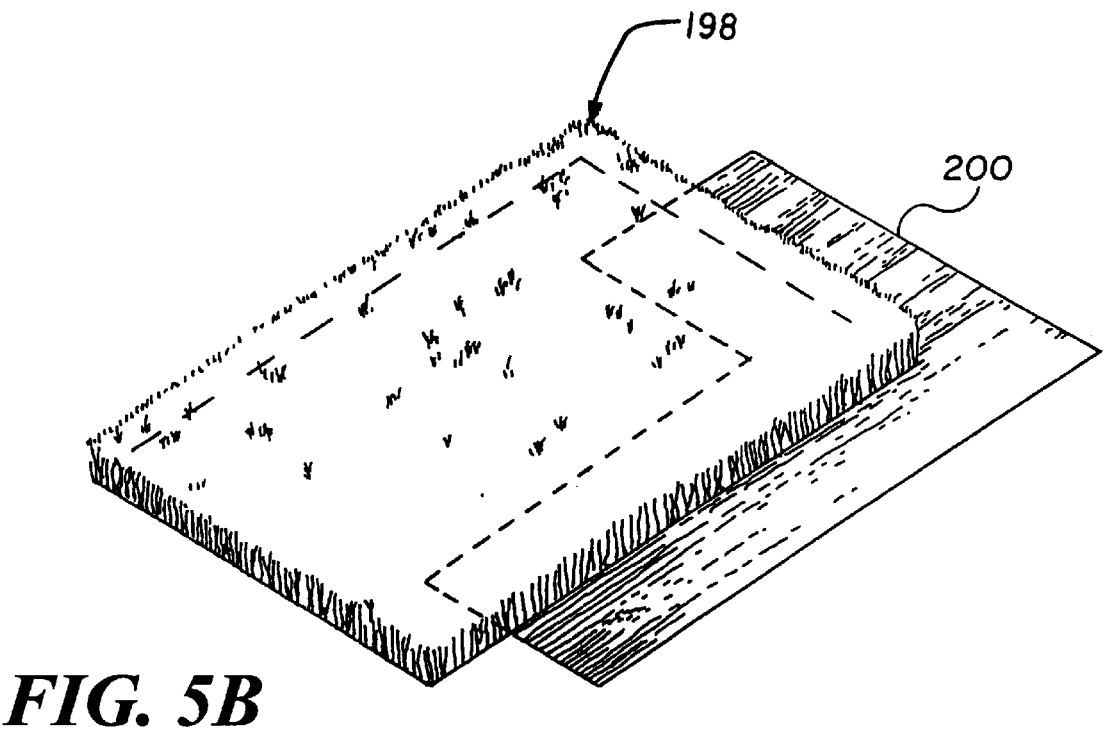

As illustrated in FIGS. 5A and 5B, it is desirable to reinforce the edges of the panels 198 or synthetic turf base 104 as they are installed. In the embodiment illustrated in FIGS. 5A and 5B, the edges between the various panels 198 are reinforced by first applying a mesh-type material 200 upon the foundation prior to placing the panels 198. Also as illustrated in FIGS. 5A and 5B, the mesh material is provided in an L shape such that the mesh-type materials fit together so that the mesh-type material 200 underlies all of the edges of the adjoining panels 198. The mesh-type material 200 is provided so that the roots of the natural grass plants grow through the panels 198 and down through the mesh-type material 200 and into the underlying foundation. Thus, the roots of the natural grass plants interlock the edges of the panels 198 with the mesh-type material 200 and the underlying foundation. The interlocking of the panels, mesh-type material 200, and foundation help to ensure that the edges of the panels 198 are efficient and reliably joined together thus preventing possible movement of one panel with respect to another or possible lifting of the edges of the panels.

Figure 8A:
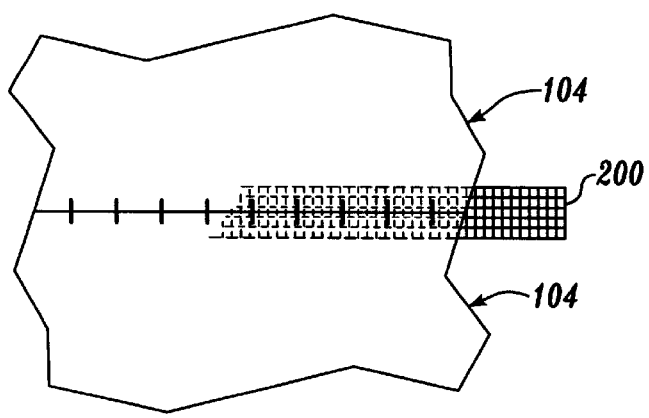
FIGS. 8A and 8B are a plan view and a cross-sectional view, respectively, of a portion of the installation of one embodiment of the invention.
Figure 8B:
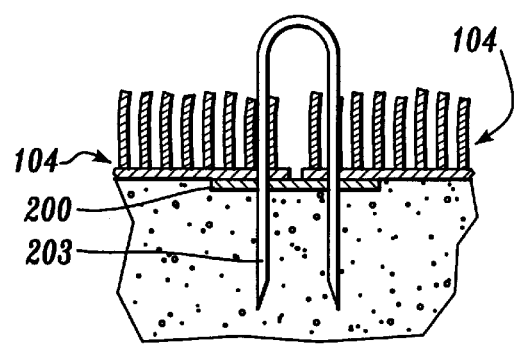

FIGS. 8A and 8B illustrate a second embodiment of a mesh-type material that may be used to reinforce the edges of the adjoining synthetic turf bases 104. As illustrated in FIGS. 8A and 8B, the mesh-type material 200 is placed underneath the adjoining edges of two synthetic turf base pieces. In the embodiment illustrated in FIGS. 8A and 8B, the mesh-type material 200 is shown with respect to the use of long narrow strips of material that are used in installations using long, large adjoining pieces of synthetic turf base 104. However, narrow strips of mesh-type material 200 such as that shown in FIGS. 8A and 8B could also be utilized in the installation of the panels 198 as opposed to the L shaped mesh configuration illustrated in FIGS. 5A and 5B.

The mesh-type material 200 illustrated in FIGS. 8A and 8B is installed underneath the edges of the two adjoining synthetic turf base pieces 104. In order to further ensure that the edges of the synthetic turf base pieces do not shift or become otherwise displaced during completion of the installation, it is desirable to anchor the edges of the synthetic turf base pieces and mesh-type material 200. In the embodiment illustrated in FIGS. 8A and 8B, U-shaped anchors 203 are inserted into the installed synthetic turf base 104 such that the opposing points of the U-shaped anchors extend through the opposing edges of the synthetic turf base pieces, through the mesh-type material 200 and into the underlying foundation. The U-shaped anchors 203 are left in position during the subsequent filling of the synthetic turf base with a growth medium and removed prior to seeding.

Figure 11:
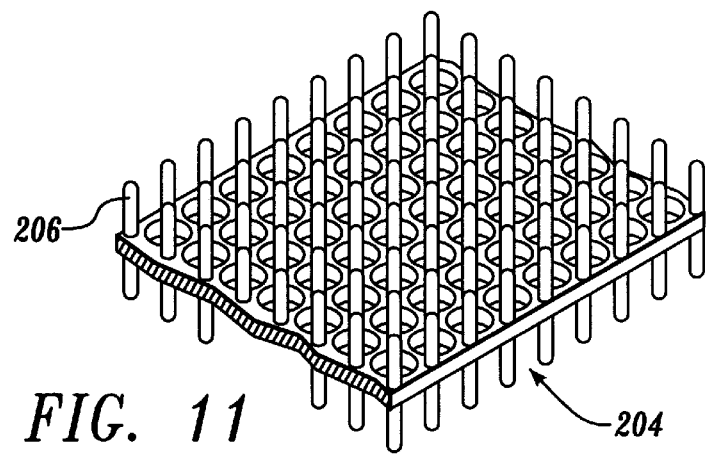
FIGS. 11 and 12 are a perspective view and a cross-sectional view, respectively, of an alternate embodiment of a portion of the installation of one embodiment of the invention.
Figure 12:
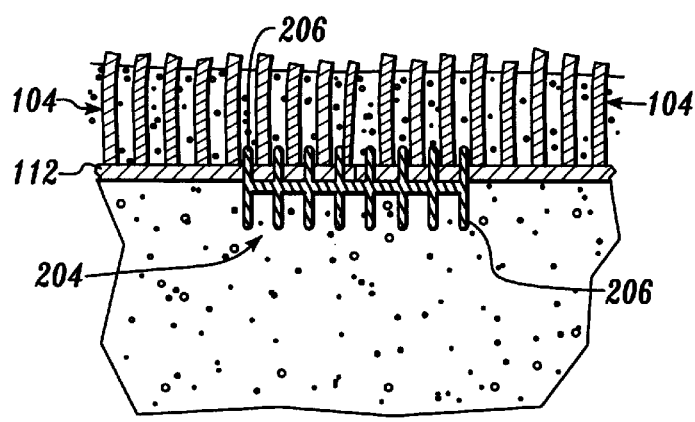

Another embodiment of a mesh-type material is illustrated in FIGS. 11 and 12. The mesh-type material 204 illustrated in FIGS. 11 and 12 is fabricated from a rubber, plastic, or other material. The mesh-type material 204 includes a plurality of spikes or other protrusions 206 that extend either upward from the upper surface of the material, downward from the lower surface of the material, or both upper and downward from the upper and lower surfaces of the material, respectively, depending on the application. The area between the protrusions 206 is left open to allow the roots of the natural grass plants to grow through the mesh-type material 204 as discussed above.

As illustrated in FIG. 12, when installed, the protrusions 206 extend downward into the foundation and upward through the backing material 112 of the synthetic turf base 104. The protrusions 206 thus help to anchor the mesh-type material 204 in the proper position on the foundation and also help the mesh-type material 204 to engage and stabilize the edges of the synthetic turf base 104. The embodiment illustrated in FIGS. 11 and 12 may provide additional stability to the installation during subsequent filling of the synthetic turf base 104 with growth medium and planting of natural grass. In addition, the embodiment of the mesh-type material 204 may also help to eliminate the need for the use of the U-shaped anchors 203 discussed above.

Figure 10:
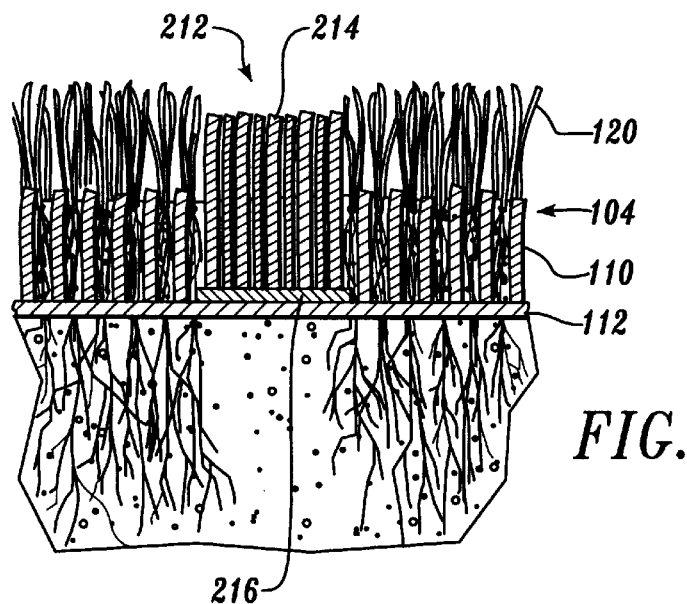
FIG. 10 is a cross-sectional view of another embodiment of the invention incorporating a built in line indicator.

As discussed briefly in the background section, one of the problems associated with prior playing surfaces used for football, soccer, and some other sports is the application of boundary indicators such as boundary lines and yardage lines. FIG. 10 illustrates an embodiment of the invention that incorporates built-in boundary indicators that help to eliminate the problems associated with prior boundary indicators. As illustrated and discussed above, the synthetic turf base 104 includes a porous backing 112 and a plurality of upwardly extending synthetic grass fibers 110. In the embodiment illustrated in FIG. 10, the synthetic turf base 104 includes an indicator portion 212 that is configured to provide boundary indications, line indications, etc. In the preferred embodiment, the indicator portion 212 is formed by forming a portion of the synthetic turf base 104 without any synthetic turf fibers 110. The indicator portion 212 is then formed separately by tufting synthetic indicator fibers 214 into an indicator backing material 216.

Unlike the synthetic turf base 104, it is advantageous to form the indicator backing material 216 from a material that is impervious to the root growth of natural grass plants to help prevent grass from growing into the indicator portion. It is also advantageous to form the synthetic fibers 214 of a sufficient length that they extend upward from the surface of the backing material 216 such that the tops of the indicator fibers 214 are at approximately the same height as the top of the mowed natural grass blades 120 growing in the synthetic turf base 104.

In some applications, it is also advantageous to form the indicator portion 212 with a much more dense distribution of synthetic fibers 214 than that used in the surrounding synthetic turf base 104. Forming the indicator portion 212 with a sufficiently dense distribution of synthetic fibers 214 helps to prevent the natural grass from growing into or otherwise becoming part of the indicator portion 212. It is also advantageous to form the indicator backing material 216 with a type of herbicide included in the backing material to prevent natural grass from growing into the indicator portion 212. It is further advantageous to form the imitation fibers 214 of a color that contrasts with the natural color of the grass thus allowing the indicator portion 212 to be easily observed by players and onlookers.

The indicator portion 212 may be attached to the backing material 112 by applying an adhesive between the indicator backing material 216 and the backing material 112. Alternatively, the indicator portion 212 may be sewn or otherwise attached to the backing material 112. In yet other embodiments, the synthetic fibers 214 may be tufted directly into the backing material 112. However, in such applications it is advantageous that the backing material 112 in the region of the indicator portion 212 be coated with an impervious material either before or after the tufting of the imitation fibers 214 to prevent grass growth through the backing in the region of the indicator portion 212.

In addition to forming boundary lines, etc., as described above, graphical indicators such as high school or college logos, names, etc., may also be formed in the artificial turf base 104 in a manner similar to that described above with respect to the indicator portion 212.

Forming the indicators such as boundary lines, etc., through the use of longer synthetic fibers 214 having different colors, etc., reduces several of the problems associated with prior art playing surfaces. Indicators formed in accordance with the invention provide a long term indication and require minimal if any maintenance. In addition, such indicators do not provide a slippery or hard surface as produced by repeatedly painting indicators directly upon an artificial or natural playing surface.

It will be apparent to those skilled in the art that although several preferred embodiments of the invention have been described in detail herein, many modifications and variations may be provided without departing from the true scope and spirit of the invention. Accordingly, the spirit and scope of the invention is not limited except as by the scope of the claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A playing surface comprising:
   (a) a foundation;
   (b) a synthetic turf located on top of the foundation and including a porous backing material and a plurality of synthetic fibers extending generally vertically upward from the backing material, the porous backing material having openings therethrough, the openings dispersed and distributed substantially across the entire surface area of the backing to permit a majority of the roots of natural grass plants to grow therethrough;
   (c) a layer of growth medium disposed on top of the backing material of the synthetic turf to a depth sufficient to fill the synthetic turf to above an elevation defined by the tops of the synthetic fiber, to form an overfill layer portion above the synthetic turf; and
   (d) natural grass plants, having grass blades, crowns and roots disposed in the growth medium, the roots extending downward through the growth medium through the backing material, and into the foundation, the crowns being located within the overfill layer portion of the growth medium.

2. The playing surface of claim 1, wherein the crowns of natural grass plants are disposed slightly below a top surface of the overfill layer portion of the growth medium.

3. The playing surface of claim 1, wherein the natural grass plants comprise rhizomatious grass plants.

4. A method of forming a natural grass playing surface, comprising the steps of:
   (a) providing a foundation;
   (b) placing a synthetic turf on top of the foundation including a porous backing material and a plurality of synthetic fibers extending generally vertically upward from the backing material, the porous backing material having openings therethrough, the openings dispersed and distributed substantially across the entire surface area of the backing to permit a majority of the roots of natural grass plants to grow therethrough;

(c) applying a layer of growth medium on top of the backing material of the synthetic turf to a depth sufficient to fill the synthetic turf to above an elevation defined by the tops of the synthetic fibers, to form an overfill layer portion above the synthetic turf; and (d) growing natural grass plants within the layer of growth medium, the natural grass plants having grass blades extending upwardly from a top surface of the growth medium, crowns located within the overfill layer portion of the growth medium, and roots extending downwardly through the growth medium through the backing material and into the foundation.

5. The method of claim 4, wherein the growing of natural grass plants comprises sprigging the growth medium with a rhizomatious grass.

6. A playing surface comprising:

(a) a foundation;

(b) a synthetic turf located on top of the foundation and including a porous backing material and a plurality of synthetic fibers extending generally vertically upward from the backing material, including a plurality of first fibers of a first length interspersed with a plurality of second fibers of a second length greater than the first length, the porous backing material having openings therethrough, the openings dispersed and distributed substantially across the entire surface area of the backing to permit a majority of the roots of natural grass plants to grow therethrough;

(c) a layer of growth medium disposed on top of the backing material of the synthetic turf to a depth sufficient to fill the synthetic turf to above an elevation defined by the tops of the second fibers, to form an overfill layer portion above the synthetic turf; and (d) natural grass plants having grass blades extending upwardly above the growth medium, crowns within the growth medium and just below an upper surface of the growth medium, and roots extending downwardly through the growth medium, the backing material, and into the foundation.

7. The playing surface of claim 6, wherein the growth medium is filled to approximately the upper ends of the second fibers.

8. The playing surface of claim 7, wherein the second fibers are substantially uniformly interspersed with the first fibers.

9. A playing surface comprising:

(a) a foundation;

(b) a synthetic turf located on top of the foundation and including a backing material that is at least partially biodegradable, the synthetic turf further including a plurality of synthetic fibers secured to and extending generally vertically upward from the backing material, the backing material having openings therethrough, the openings dispersed and distributed substantially across the entire surface area of the backing to permit a majority of the roots of natural grass plants to grow therethrough;

(c) a layer of growth medium disposed on top of the backing material of the synthetic turf to a depth sufficient to fill the synthetic turf to above an elevation defined by the tops of the synthetic fibers, to form an overfill layer portion above they synthetic turf; and (d) natural grass plants having grass blades, crowns, and roots, the crowns being located slightly below a top surface of the layer of growth medium at an elevation spaced above the backing material, the roots extending downward through the growth medium, the backing material, and into the foundation.

10. A method of forming a natural grass playing surface, comprising the steps of:

(a) providing a foundation;

(b) placing a synthetic turf on top of the foundation, the synthetic turf including a backing material that is at least partially biodegradable and a plurality of synthetic fibers secured to and extending generally vertically upward from the backing material of the backing material having openings therethrough, the openings dispersed and distributed substantially across the entire surface area of the backing to permit a majority of the roots of natural grass plants to grow therethrough;

(c) a layer of growth medium disposed on top of the backing material of the synthetic turf to a depth sufficient to fill the synthetic turf to above an elevation defined by the tops of the synthetic fibers, to form an overfill layer portion above they synthetic turf; and (d) growing natural grass plants within the layer of growth medium, the grass plants having grass blades, crowns located slightly below a top surface of the layer of growth medium at an elevation spaced above the backing material, and roots extending downward through the growth medium, the backing material, and into the foundation.

11. A playing surface comprising:

(a) a foundation;

(b) a synthetic turf located on top of the foundation including a backing material and a plurality of synthetic fibers, comprising synthetic fibers each having an aperture defined therethrough and extending generally vertically upward from the backing material, the backing material having openings therethrough, the openings dispersed and distributed substantially across the entire surface area of the backing to permit a majority of the roots of natural grass plants to grow therethrough;

(c) a layer of growth medium disposed on top of the backing material of the synthetic turf to a depth sufficient to fill the synthetic turf to above an elevation defined by the tops of the synthetic fibers, to form an overfill layer portion above they synthetic turf; and (d) natural grass plants having grass blades, crowns, and roots, the crowns being located slightly below a top surface of the layer of growth medium at an elevation spaced above the backing material, the roots growing through the apertures provided in the synthetic fibers and extending downward through the growth medium, the backing material, and into the foundation.

12. A method of forming a natural grass playing surface, comprising the steps of:

(a) providing a foundation;

(b) placing a synthetic turf on top of the foundation, the synthetic turf including a backing material and a plurality of synthetic fibers, a plurality of the synthetic fibers having at least one aperture defined therethrough and the fibers extending generally vertically upward from the backing material, the backing material having openings therethrough, the openings dispersed and distributed substantially across the entire surface area of the backing to permit a majority of the roots of natural grass plants to grow therethrough;

(c) applying a layer of growth medium disposed on top of the backing material of the synthetic turf to a depth sufficient to fill the synthetic turf to above an elevation defined by the tops of the synthetic fibers, to form an overfill layer portion above they synthetic turf; and (d) growing natural grass plants within the layer of growth medium, the grass plants having grass blades, crowns located slightly below a top surface of the layer of growth medium at an elevation spaced above the backing material, and roots growing through the apertures provided in the synthetic fibers and extending downward through the growth medium, the backing material, and into the foundation.

13. A playing surface comprising:
(a) a foundation;
(b) a synthetic grass turf located on top of the foundation and including a backing material and a plurality of synthetic grass fibers extending generally vertically upward from the backing material, the synthetic grass fibers being formed of at least a first group of fibers having a first length and a second group of fibers having a second length longer than the first length so that the second group of fibers extends upward from the backing material a greater distance than the first group of fibers, the backing material having openings therethrough, the openings dispersed and distributed substantially across the entire surface area of the backing to permit a majority of the roots of natural grass plants to grow therethrough;
(c) a layer of growth medium disposed on top of the backing material to a depth sufficient to fill the synthetic turf to above an elevation defined by the tops of the second group of fibers to form an overfill layer portion above the synthetic turf; and
(d) natural grass plants having grass blades, crowns, and roots disposed in the growth medium, the roots extending downward through the growth medium, the backing material, and into the foundation, and the grass blades extending upward.

14. A method of forming a playing surface comprising:
(a) forming a foundation;
(b) placing more than one piece of synthetic grass turf on the foundation, the synthetic grass turf having a plurality of synthetic grass fibers extending generally vertically upward from a backing material, the backing material having openings therethrough, the openings dispersed and distributed substantially across the entire surface area of the backing to permit a majority of the roots of natural grass plants to grow therethrough;
(c) placing a porous mesh material on the foundation between the foundation and the backing material of the synthetic grass turf so that the mesh material underlies adjoining edges of the synthetic grass turf;
(d) filling the synthetic grass turf with a growth medium to above an elevation defined by the tops of the synthetic grass fibers, to form an overfill layer portion above the synthetic grass turf; and
(e) sowing natural grass on top of the growth medium so that the roots of the natural grass plants extend downward through the synthetic grass turf, through the mesh material, and into the foundation so that the blades of the natural grass plants extend upward from a top of the growth medium to form a playing surface of natural grass.

15. A playing surface comprising:
(a) a foundation;
(b) a synthetic turf located on top of the foundation including a fabric backing, fleece material needle-punched through the fabric backing, and a plurality of generally upright synthetic fibers mounted in the fabric backing;
(c) a layer of growth medium disposed on top of the woven backing of the synthetic turf to at least partially fill the fibers; and
(d) natural grass plants having grass blades, crowns, and roots disposed in the growth medium the roots extending downward through the growth medium, the woven backing and into the foundation, and the blades extending upward.

16. The playing surface of claim 15, wherein the needle-punched fleece material at least partially comprises biodegradable material.

17. The playing surface of claim 16, wherein the fleece material comprises different biodegradable materials that degrade at different rates to produce a greater degree of porosity in the fleece material over time.

18. The playing surface of claim 15, wherein the fleece material is applied to the underside of the woven backing and needle-punched therethrough.

19. A playing surface comprising:
(a) a foundation;
(b) a synthetic turf located on top of the foundation including a porous backing material and a plurality of synthetic fibers, the synthetic fibers each having an aperture defined therethrough and extending generally vertically upward from the backing material, the porous backing material having openings therethrough, the openings dispersed and distributed substantially across the entire surface area of the backing to permit a majority of the roots of natural grass plants to grow therethrough;
(c) a layer of growth medium disposed on top of the woven backing of the synthetic turf to above an elevation defined by the top of the fibers, to form an overfill layer portion above the synthetic turf; and
(d) natural grass plants having grass blades, crowns, and roots disposed in the growth medium, the roots extending downward through the growth medium, through the backing, and into the foundation, and the blades extending upward above the top of the layer of growth medium.

20. The playing surface of claim 19, wherein the synthetic fibers comprise synthetic fibers each having a plurality of apertures defined therethrough.

21. The playing surface of claim 20, wherein the apertures provided in the synthetic fibers are splits or fibrillations.

22. The playing surface of claim 19, wherein the roots extending downward through the growth medium grow through the apertures provided in the synthetic fibers, thereby becoming intertwined with the synthetic fibers.

23. The playing surface of claim 22, wherein the backing material is at least partially formed of biodegradable material so that the backing disintegrates after the roots and the synthetic fibers become intertwined.

24. A method of forming a playing surface, comprising the steps of:
(a) providing a foundation;
(b) placing a synthetic turf on top of the foundation including a porous backing material and a plurality of synthetic fibers, each fiber having a plurality of apertures therethrough and extending generally vertically upward from the backing material, the porous backing material having openings therethrough, the openings dispersed and distributed substantially across the entire surface area of the backing to permit a majority of the roots of natural grass plants to grow therethrough;

(c) applying a layer of growth medium disposed on top of the woven backing of the synthetic turf to above an elevation defined by the top of the fibers, to form an overfill layer portion above the synthetic turf; and (d) growing natural grass plants within the layer of growth medium, the grass plants having grass blades, crowns, and roots disposed in the growth medium, the roots growing through the apertures provided in the synthetic fibers, extending downward through the growth medium, through the backing, and into the foundation, and the blades extending upward.

25. A playing surface comprising:

(a) a foundation;

(b) a synthetic turf located on top of the foundation and including a porous backing material and a plurality of synthetic fibers with free ends extending generally vertically upward from the backing material, a plurality of the synthetic fibers having at least one aperture defined therein, the porous backing material having openings therethrough, the openings dispersed and distributed substantially across the entire surface area of the backing to permit a majority of the roots of natural grass plants to grow therethrough;

(c) a layer of growth medium disposed on top of the backing material of the synthetic turf to a depth sufficient to partially fill the synthetic turf to substantially below an elevation defined by the tops of the synthetic fibers; and (d) natural grass plants having grass blades, crowns and roots, the crowns being located slightly below a top surface of the layer of growth medium at an elevation spaced above the backing material, the roots extending downwardly through the growth medium and through at least some of the apertures, through the backing material, and into the foundation, thereby to strengthen the holding capability of the synthetic turf and to further stabilize the natural grass plants.

26. A method of forming a natural grass playing surface, comprising the steps of:

(a) providing a foundation;

(b) placing a synthetic turf on top of the foundation including a porous backing material and a plurality of synthetic fibers with free ends extending generally vertically upward from the backing material, a plurality of the synthetic fibers having at least one aperture defined therein, the porous backing material having openings therethrough, the openings dispersed and distributed substantially across the entire surface area of the backing to permit a majority of the roots of natural grass plants to grow therethrough;

(c) applying a layer of growth medium on top of the backing material of the synthetic turf to a depth sufficient to partially fill the synthetic turf to substantially below an elevation defined by the tops of the synthetic fibers; and (d) growing natural grass plants within the layer of growth medium, the grass plants having grass blades, crowns located slightly below a top surface of the layer of growth medium at an elevation spaced above the backing material, and roots extending downwardly through the growth medium and through at least some of the apertures, through the backing material, and into the foundation, thereby to strengthen the holding capability of the synthetic turf and to further stabilize the natural grass plants.

* * * * *

UNITED STATES PATENT AND TRADEMARK OFFICE
CERTIFICATE OF CORRECTION

PATENT NO.   : 6,295,756 B1
DATED        : October 2, 2001
INVENTOR(S)  : Jerry G. Bergevin It is certified that error appears in the above-identified patent and that said Letters Patent is hereby corrected as shown below:

Column 2,
Line 60, should not be a new paragraph.

Column 3,
Line 55, reads "view of a embodiment of an improved surface" and should read -- view of an embodiment of an improved surface --.

Column 5,
Line 36, reads "It is advantages that" and should read -- It is advantageous that --.

Column 6,
Line 33, reads "substituted therefore without" and should read -- substituted therefor without --.
Line 43, reads "it is also advantages to incorporate a" and should read -- it is also advantageous to incorporate a --.

Column 10,
Line 15, reads "less mechanic aeration" and should read -- less mechanical aeration --.

Column 11,
Line 13, reads "exposed portions of… may help to protect…and helps provide" and should read -- exposed portions of…may help to protect…and help provide --.

Column 12,
Line 42, reads "FIG. 7 is a particularly well suited for use with" and should read -- FIG. 7 is particularly well suited for use with --.
Line 61, reads "the roots 124 of … grows down into" and should read -- the roots 124 of … grow down into --.

Column 14,
Line 66, reads "or both upper and downward from the upper and lower" and should read -- or both upward and downward from the upper and lower --.

Column 17,
Line 65, reads "…they synthetic turf…" and should read -- …the synthetic turf… --.

UNITED STATES PATENT AND TRADEMARK OFFICE
CERTIFICATE OF CORRECTION

PATENT NO.    : 6,295,756 B1
DATED         : October 2, 2001
INVENTOR(S)   : Jerry G. Bergevin It is certified that error appears in the above-identified patent and that said Letters Patent is hereby corrected as shown below:

Column 18,
Line 12, reads "...upward from the backing material of the backing material having openings therethrough,..." and should read -- ...upward from the backing material, the backing material having openings therethrough,... --.
Lines 21 and 45, "...they synthetic turf..." and should read -- ...the synthetic turf... --.

Column 19,
Line 3, reads "...they synthetic turf..." and should read -- ...the synthetic turf... --.

Signed and Sealed this

Seventeenth Day of February, 2004

JON W. DUDAS
*Acting Director of the United States Patent and Trademark Office*